United States Patent

Siller

[15] 3,705,699
[45] Dec. 12, 1972

[54] TAPE RECORDER AND CASSETTE FOR MAGNETIC TAPE

[72] Inventor: Imre Siller, Nuremberg, Germany

[73] Assignee: Grundig E.M.V., Elektro-Mechanische & Versuchsanstalt, Furth/Bay, Germany

[22] Filed: Feb. 4, 1970

[21] Appl. No.: 8,643

[30] Foreign Application Priority Data

| April 16, 1969 | Germany | G 69 15 105.9 |
| Feb. 8, 1969 | Germany | G 69 05 057 |
| Feb. 7, 1969 | Germany | G 69 04 673 |
| March 20, 1969 | Germany | G 69 11 147 |
| March 18, 1969 | Germany | G 69 10 787 |
| April 16, 1969 | Germany | G 69 15 105 |

[52] U.S. Cl....................242/199, 116/135, 274/4 C
[51] Int. Cl..............................................G11b 23/00
[58] Field of Search........242/57, 187, 193, 194, 197, 242/201, 202, 205, 206; 33/127; 274/11 C, 11 D, 11 E, 4 C, 4 D; 116/135

[56] References Cited

UNITED STATES PATENTS

| 2,096,445 | 10/1937 | Begun | 242/57 |
| 2,767,474 | 10/1956 | Schmitt, Jr. | 33/127 |
| 3,441,283 | 4/1969 | Jager | 274/11 |
| 3,476,894 | 11/1969 | Pless | 242/201 X |

FOREIGN PATENTS OR APPLICATIONS

| 712,756 | 7/1965 | Canada | 33/127 |

Primary Examiner—Werner H. Schroeder
Attorney—Michael S. Striker

[57] ABSTRACT

A cassette for magnetic tape which is provided with a scale and a pointer movable along the scale to indicate the length of that portion of tape which has been transported past or is yet to move past a recording or reproducing head in a tape recorder. The scale can be illuminated to facilitate reading in darkness and can be designed to be visible from one, two or three sides of the housing of the cassette. The tape recorder is provided with means for producing optical signals to indicate that the tape is about to move one of its tracks past the erasing head, and with a mechanism which can drive the pointer in response to transport of the tape. The length of the scale is a function of the length of tape so that the pointer reaches the one or the other end of the scale when the tape is fully collected on the one or the other reel in the housing of the cassette.

8 Claims, 11 Drawing Figures

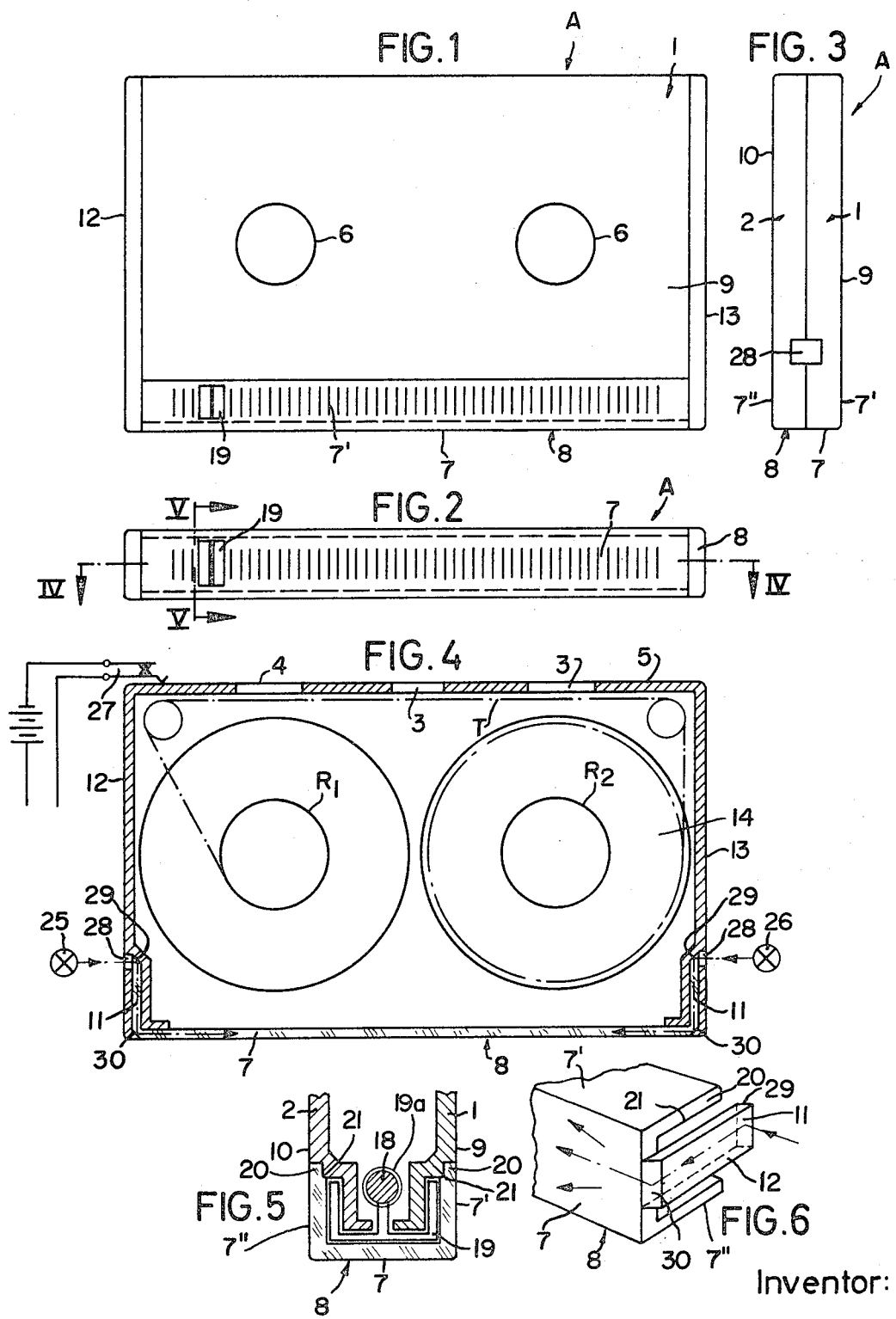

Inventor:
IMRE SIGLER

TAPE RECORDER AND CASSETTE FOR MAGNETIC TAPE

BACKGROUND OF THE INVENTION

The present invention relates to improvements in sound recording and reproducing apparatus, and to improvements in cassettes or magazines which can be used in or with such apparatus to accommodate a supply of magnetic tape and to permit lengthwise movement of tape past recording, reproducing and erasing heads.

A drawback of presently known cassettes is that they are not usable in tape recorders of the type wherein the cassette is placed onto the deck as well as in recorders of the type wherein the cassette must be inserted into a chamber of the recorder frame. Another drawback of many present tape recorders is that the means for indicating the length of those portions of tape which have been transported or are yet to be transported past the recording or reproducing head is not readily discernible or is discernible only when the cassette is held in a predetermined position. Furthermore, a user is likely to accidentally erase the information which is stored on a tape because a conventional tape recorder does not embody any means for producing a signal just prior to or in response to start of erasing.

SUMMARY OF THE INVENTION

An object of the invention is to provide a cassette or magazine which can be used in tape recorders of the type wherein the deck supports the one or the other side of the invertible cassette or wherein the cassette is insertable into a slot or chamber so that only one of its narrow end walls can be seen when the tape recorder is in use.

Another object of the invention is to provide the cassette with novel indicator means which enables the user to determine, at a glance, that length of the tape which is still available for recording of information regardless of whether the cassette rests on one side, on the other side or is inserted into a chamber of the tape recorder.

A further object of the invention is to provide an indicator structure which also serves as a means for reinforcing the housing of the cassette.

An additional object of the invention is to provide a cassette wherein the indicator structure is visible even if the tape recorder using such cassette is operated in darkness.

Another object of the invention is to provide a tape recorder with novel means for insuring proper illumination of the indicator means in the cassette.

Still another object of the invention is to provide the tape recorder with illuminating means which is rendered operative in automatic response to proper mounting of a cassette.

A further object of the invention is to provide a tape recorder with an optical warning device which informs the user that the information stored on a magnetic tape is about to be erased so that the user can remove the cassette if the tape therein contains information which should be preserved.

An additional object of the invention is to provide a cassette which is capable of preventing the starting of drive which transports the tape past the erasing head of the tape recorder.

Still another object of the invention is to provide a cassette which embodies an indicator assembly including one or more scales whose length is a function of the length of magnetic tape in the cassette so that the means for pinpointing graduations or other symbols of the scale invariably registers with the one or the other end of a scale when the entire tape has been used for recordal or reproduction of information.

A further object of the invention is to provide a cassette wherein the direction in which the pointer travels along a scale invariably corresponds to the direction of transport of magnetic tape and wherein the direction of travel of the pointer is reversed without delay in automatic response to changes in the direction of transport of the tape.

The novel features which are considered as characteristic of the invention are set forth in particular in the appended claims. The improved cassette itself, however, both as to its construction and the mode of utilizing the same, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view of a cassette which embodies one form of the invention and comprises a novel indicator structure for the unrecorded length of the magnetic tape;

FIG. 2 is a bottom plan view of the cassette shown in FIG. 1;

FIG. 3 is an end elevational view of the cassette;

FIG. 4 is a sectional view as seen in the direction of arrows from the line IV—IV of FIG. 2;

FIG. 5 is an enlarged fragmentary sectional view as seen in the direction of arrows from the line V—V of FIG. 2;

FIG. 6 is an enlarged fragmentary perspective view of the scale in the indicator structure of the cassette shown in FIG. 1;

DESCRIPTION OF THE PREFERRED EMBODIMENTS

Figure 7:
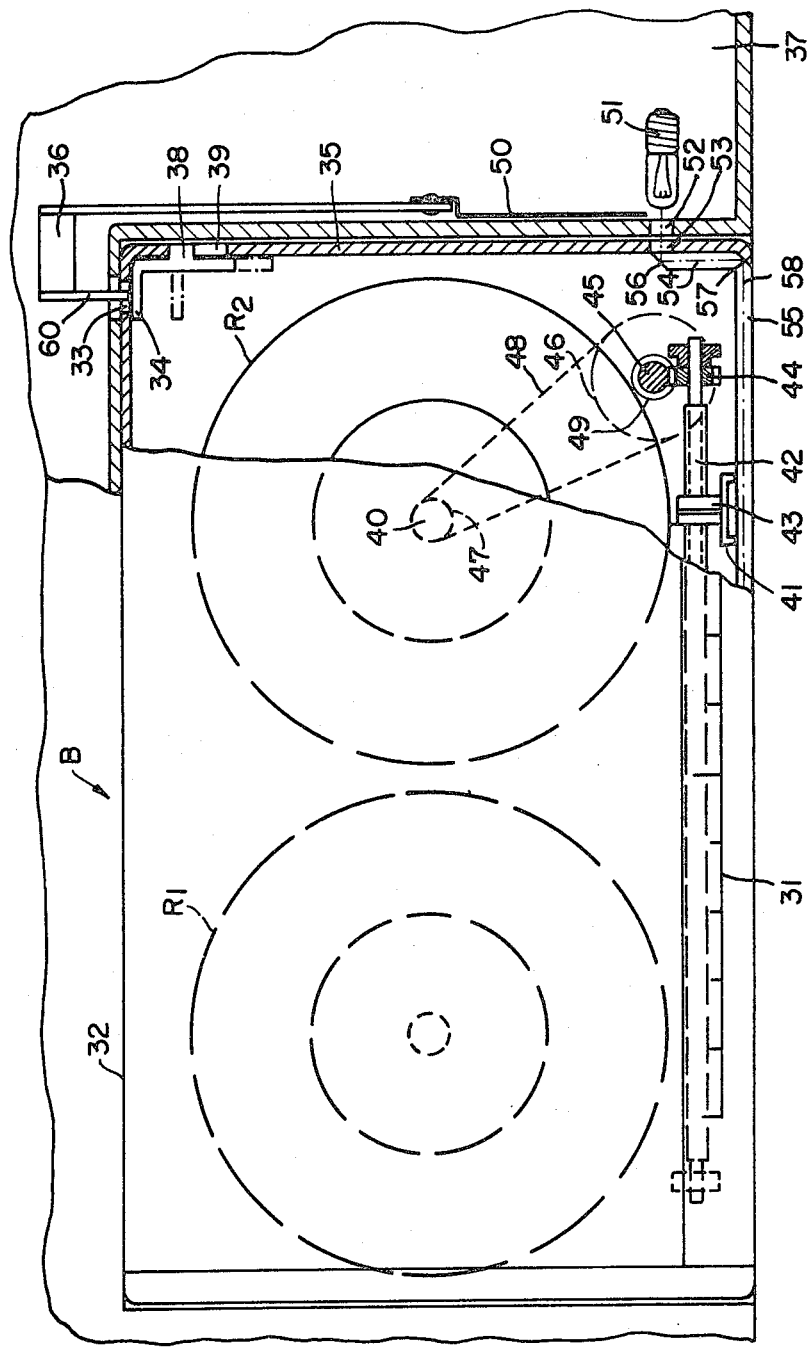
FIG. 7 is fragmentary sectional view of a tape recorder which is provided with a novel optical warning device and a partly elevational and partly sectional view of a cassette constituting a modification of the cassette shown in FIGS. 1–6.

FIGS. 1–4 illustrate a cassette or magazine A whose housing or casing preferably consists of slightly elastic synthetic plastic material and comprises two identical mirror symmetrical halves or shells 1, 2. The housing of the cassette A resembles a flat brick or block and one (5) of its narrow longer end walls is formed with windows 3 for magnetic recording, reproducing and erasing heads (not shown) as well as with a further window or opening 4 for the pressing roll (not shown) serving to engage the tape T when the cassette is properly mounted in or on a sound recording and reproducing apparatus (hereinafter called tape recorder). The side walls 9, 10 of the housing are provided with pairs of registering openings 6 which permit engagement between the cores of reels R1, R2 and the customary drive means in the tape recorder.

In accordance with a feature of the invention, a portion 8 of the housing of the cassette A consists of light transmitting (transparent or translucent) synthetic plastic material and forms an elongated scale of substantially U-shaped cross-sectional outline. This scale 8 comprises a central panel or web 7 and two side panels or flanges 7', 7''. The central panel 7 constitutes the other longer end wall of the housing and is located opposite the end wall 5. The longitudinal ends of the panel 7 are provided with suitably inclined projections or lugs 11 which are received in complementary recesses of the shorter end walls 12, 13 of the housing. When the lugs 11 are accommodated in their respective recesses and the panels 7', 7'' are properly secured to the adjacent edge portions of the side walls 9, 10, the scale 8 closes and preferably also seals the corresponding portion of the housing to prevent dust or moisture from reaching the convolutions 14 of the tape T on the reel R1 and/or R2. The material of the scale 8 is preferably at least as rigid as the material of the remainder of the housing so that it can serve as a stiffener for the adjacent edge portions of the side walls 9, 10. The manner in which the panels 7', 7'' are separably coupled to the side walls 9, 10 is shown in FIG. 5. The longitudinally extending edges of the panels 7', 7'' have inwardly extending beads 20 which are adjacent to grooves 21, and the outer sides of the side walls 9, 10 have grooves and beads which respectively receive and extend into beads 20 and grooves 21. In order to snap the scale 8 onto the side walls 9, 10, the free edge portions of the panels 7', 7'' must be moved apart whereupon the beads and grooves on the panels respectively engage the grooves and beads on the adjoining side walls.

The housing of the cassette A accommodates a transporting device which serves to move an index or pointer 19 lengthwise of the scale 8. This pointer comprises a spindle nut or follower 19a mating with or tracking a threaded spindle 18 which is rotatably mounted in the housing centrally between the side walls 9, 10 and inwardly adjacent to the central panel 7. The pointer 19 travels along the inner sides of the panels 7, 7', 7'' and is therefore visible regardless of whether the cassette A is mounted on the deck of a tape recorder in such a way that its side wall 9 and panel 7' are freely visible, that the side wall 10 and panel 7'' are freely visible, or that only the panel 7 is freely visible (i.e., when the cassette is introduced into a chamber or slot of the tape recorder).

The spindle 18 of the transporting mechanism for the pointer 19 is driven in response to lengthwise movement of the tape T so that the position of the pointer with reference to graduations of the scale 8 indicates the length of that portion of tape which was moved past the recording head or the number of time units during which the tape T was transported from reel R1 to reel R2 or vice versa. In this way, the operator of the tape recorder can determine at a glance whether or not the cassette must be inverted or replaced.

It is clear that the cassette of FIGS. 1 to 6 is susceptible of many modifications without departing from the spirit of the present invention. For example, the pointer 19 can be mounted for travel at the outer side of the scale 8 or in a groove of the scale. Also, the spindle 18 can be replaced with an endless band or cord or with a band or cord of finite length. Still further, the major part of the housing may consist of metallic material and the scale 8 can be replaced with a scale having only two panels, i.e., the panels 7, 7' or 7, 7''. A scale with three panels is preferred at this time because it enhances the versatility of the cassette, i.e., it enables the operator to determine the length of the unused portion of tape T in a cassette which is invertible and which is also usable in tape recorders of the type wherein the cassette is fitted into a chamber or slot of the apparatus.

The graduations of the scale 8 (on the panels 7, 7', 7'') are preferably in the form of raised portions or grooves which are formed on or in the inner sides of the panels during the molding of the scale. These graduations indicate different lengths of the tape T on the reel R1 or R2 or different periods of time.

FIG. 4 further shows schematically an energy source 24 in circuit with two light sources 25, 26 and a master switch 27. The parts 24–27 are installed in the tape recorder and serve to effect illumination of scale 8. The switch 27 is installed in the path of movement of the cassette A during insertion or attachment to the recorder so that it closes automatically when the reels R1, R2 are properly coupled to the tape driving mechanism. The light sources 25, 26 then direct beams of light against apertures 28 in the end walls 12, 13 so that the incoming light passes through the lugs 11 and is deflected on inclined light reflecting surfaces or mirrors 29 of these lugs, thereupon on the inclined light reflecting surfaces or mirrors 30 at the ends of the panel 7 to illuminate at least the major portions of the panels 7, 7', 7'', and particularly the panel 7, as soon as the cassette A is properly mounted and the drive for the reels R1, R2 is on. The mirrors 29, 30 can consist of metallic foil or of metallic material which is sprayed or steamed onto the corresponding surfaces of the scale 8. The directions of travel of light rays issuing from the sources 25, 26 (e.g., small bulbs) are indicated by arrows. It is clear that the tape recorder for the cassette A may comprise a single light source or that the bulbs 25, 26 can be positioned to direct light rays against the end faces of all three panels 7, 7', 7'', i.e., that the light rays need not pass through the lugs 11 and that all three panels can be illuminated to the same extent.

The circuit for the cassette A enables the user of the tape recorder to read the scale 8 in darkness and to immediately detect the position of the pointer 19.

An advantage of the scale 8 is that its graduations can be distributed along one of the longer sides of each of the walls 9, 10 so that they can indicate a large number of tape lengths on the reel R1 or R2. In many presently known cassettes, the side walls comprise transparent portions extending radially of the reels and carrying graduations serving to indicate different diameters of convoluted tape on the respective reels. Such indicators are not reliable because the tape is often extremely thin so that a substantial length of tape can be convoluted into a roll of small diameter. Also, the reels are normally mounted with certain freedom of radial movement and this also contributes to inaccuracy of radial scales.

The mirrors 29, 30 can be provided in the housing of the cassette or on the housing and on the scale. For example, the mirrors 29 can be provided on the lugs 11 and the mirrors 30 can be provided in the end walls 12, 13. Furthermore, the illuminating means 24–27 can be used in connection with cassettes having scales including a single panel or two panels.

FIG. 7 illustrates a portion of a tape recorder and of a cassette B. One longer narrow end wall of the housing of the cassette B is adjacent to a scale 31 whose graduations preferably indicate different lengths of unused tape. The other end wall 32 of the housing is provided with an aperture 33 which can be closed or exposed by a blocking member 34 reciprocably mounted in the housing for movement along the narrow end wall 35. When the blocking member 34 assumes the solid-line position of FIG. 7, it prevents depression of a starter knob 36 which is reciprocably mounted in the frame 37 of the tape recorder. A portion 38 of the blocking member 34 extends into and is guided by an elongated slot 39 in the end wall 35; this portion 38 is accessible to the operator who can move the blocking member 34 between the solid-line and phantom-line positions of FIG. 7 by resorting to a coin or the like.

The core of the reel R2 in the housing of the cassette B can be rotated by a shaft 40 which also serves to drive a mechanism for moving a pointer or index 41 along the scale 31. This mechanism includes a spindle 42 which is rotatable in the cassette and extends in parallelism with the scale 31, a spindle nut or follower 43 which is rigid with the pointer 41 and meshes with or tracks the external threads of the spindle, a worm wheel 44 on one end portion of the spindle, a shaft 45 in the frame 37, a pulley 46 on the shaft 45, a pulley 47 on the shaft 40, an endless belt 48 which is trained over the pulleys 46, 47, and a worm 49 on the shaft 45.

At least one side wall of the cassette B is formed with an opening for the worm 49 so that the latter can mesh with the worm wheel 44 when the cassette B is properly mounted on or in the frame 37. If the motor of the tape recorder thereupon drives the shaft 40, the shaft rotates the core of the reel R2 and simultaneously rotates the spindle 42 to move the pointer 41 lengthwise of the scale 31 whereby the pointer indicates the length of unrecorded portion of the tape which is being collected by the reel R1 or R2. If the cassette B is invertible, it comprises two scales 31, one along each side wall of the housing, and the housing is then provided with two openings, one in each side wall, to permit engagement of the worm wheel 44 with another worm (not shown) which rotates the spindle 42 in response to rotation of the reel R1. The parts 47–49 constitute a step-down transmission which can drive the spindle 42 at a reduced speed such that the pointer 41 moves at a rate which is proportional to the change in diameter of convoluted tape on the reel R2. As stated before, the graduations of the scale 31 can directly indicate the available length of magnetic tape or the number of time units (e.g., minutes) during which the tape has travelled past the recording head.

The starter knob 36 is connected with an optical signal generating or warning device 50 which is a color filter (e.g., a red filter) and is movable across the path of light issuing from the light source 51 in the frame 37 when the blocking member 34 assumes the phantom-line (inoperative) position. The light source 51 can illuminate the scale 31 substantially in the same way as described in connection with FIGS. 4 and 6. Thus, light issuing from the source 51 passes through an opening 52 of the frame 37, an opening 53 in the end wall 35 and into the end portion or lug 54 of a light conducting element 55 which is parallel to the scale 51. The lug 54 has reflecting surfaces or mirrors 56, 57. The path of light in the element 55 is indicated by a phantom line, as at 58. The element 55 is outwardly adjacent to the scale 31 and illuminates the latter sufficiently to permit convenient reading of graduations and the determination of position of the pointer 43. This element 55 consists of a transparent or translucent synthetic plastic material which distributes the incoming light uniformly or substantially uniformly along the full length and width of the scale 31.

The filter 50 serves the following purpose: If the user of the tape recorder accidentally places into the frame 37 a cassette B containing magnetic tape which stores valuable information (i.e., information which should not be erased), depression of the starter knob 36 results in movement of the filter 50 in front of the opening 52 so that the scale 31 is illuminated by red light. This warns the user that the blocking member 34 is in the inoperative position and the user has time to consider, once again, whether or not the tape in the inserted cassette B should be used, i.e., whether or not the information stored on the tape should be erased prior to recordal of fresh information. If the previously stored information should not be erased, the cassette B is removed from the frame 37 and the blocking member 34 is moved to the solid-line position to thereupon prevent accidental erasure of stored information until and unless the user knowingly decides to erase the stored information. The user then returns the blocking member 34 to the phantom-line position so that, when the cassette is again attached to the frame 37, the starter knob 36 can be depressed to start the drive for the shaft 40. The knob 36 has a projection or leg 60 which passes through the aperture 33 when the blocking member 34 is in its inoperative position. The filter 50 can move across the light beam issuing from the source 51 only when the leg 60 can enter the opening 33.

In accordance with a slight modification, the starter knob 36 may constitute that part of the tape recorder which initiates the recordal of information on the tape. This insures that the filter 50 moves across the path of light issuing from the source 51 not only when the blocking member 34 is inadvertently left in the inoperative position but also whenever the tape recorder is in actual use, i.e., whenever the tape is in the process of storing fresh information. In other words, illumination of the scale 31 by red light can indicate inadvertent use of a particular cassette B as well as the fact that the tape in the cassette which is mounted in the frame 37 is storing fresh information.

It is already known to provide a cassette with a blocking member which is movable between operative and inoperative positions to thereby prevent or permit actuation of a starter knob or the like. A drawback of such conventional cassettes is that, if the blocking member is accidentally left in inoperative position, valuable information which was previously stored on the tape can be erased without any warning to the user of the tape recorder. The filter 50 of the tape recorder shown in FIG. 7 insures that attention of the user is drawn to the fact that the blocking member 34 is in inoperative position whenever the user depresses the knob 36. In this way, the user can reconsider again, prior to erasing the stored information, whether the selected cassette should be used or not.

It is clear that the filter 50 can be replaced with a green, blue or otherwise colored filter, as long as its color is different or sufficiently distinguishable from the color of light which issues from the source 51. For example, the source 51 can emit white light if the filter 50 transmits red, blue or green light.

The light conducting element 55 can be omitted if the scale 31 is mounted in the same way as the scale 8 of FIGS. 1–6, namely, so that the light source 51 can direct light rays into one end of the scale. Furthermore, the tape recorder of FIG. 7 can include illuminating means with several light sources and the blocking member 34 can be mounted externally on the housing of the cassette B.

Figure 8:
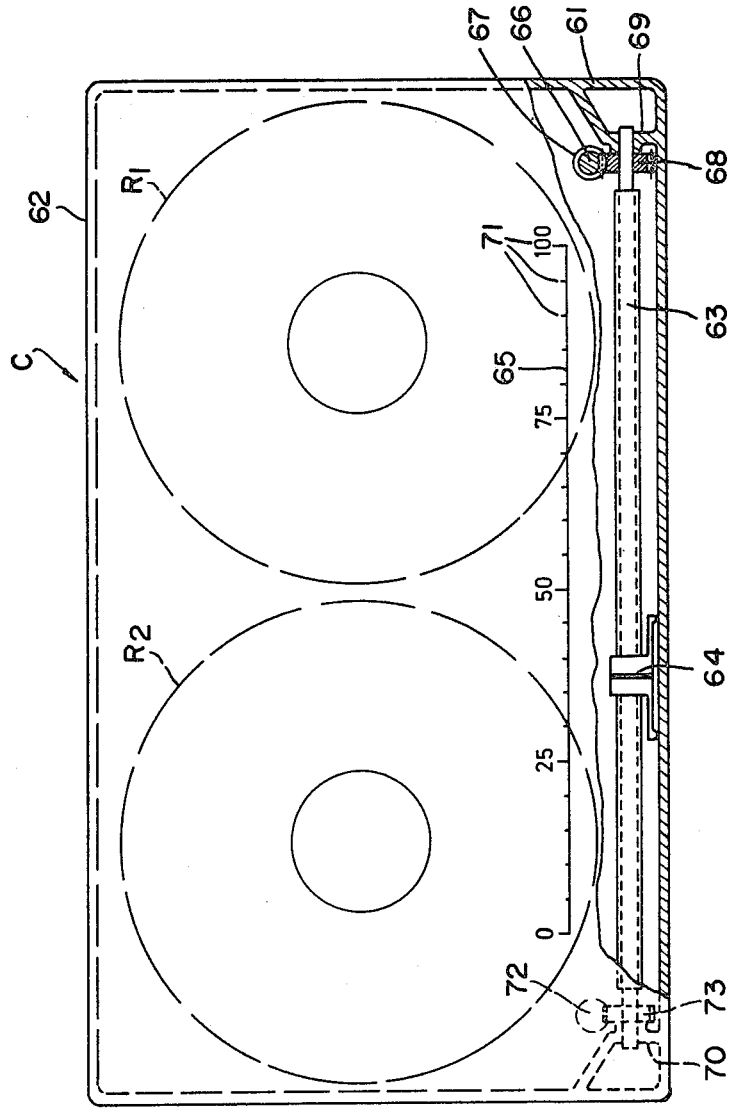
FIG. 8 is a partly elevational and partly sectional view of one of a set of cassettes wherein the length of scale or scales is a function of the length of magnetic tape.

FIG. 8 illustrates one of a set of slightly modified cassettes C. This cassette comprises a substantially block-shaped plastic housing 61 for reels R1 and R2. The top end wall 62 of the housing 61 is provided with customary windows (not shown) for the recording, reproducing and erasing heads and for a pressing roll. A spindle 63 in the housing 61 is coupled to a drive in the tape recorder to move a pointer 64 lengthwise of a scale 65. The drive includes a shaft 66 having a worm 67 which passes through an opening in the adjacent side wall of the housing 61 and mates with a worm wheel 68 on the spindle 63. The latter is rotatable in bearings 69, 70.

The graduations 71 of the scale 65 indicate different lengths of the magnetic tape (e.g., in meters or feet) or different lengths of intervals during which the reels rotate to transport the tape from the reel R1 onto the reel R2 or vice versa. For example, the scale 65 is calibrated to indicate up to 100 units of time (e.g., minutes). When the reel R2 has collected the entire length of magnetic tape, the pointer 64 registers with the graduation "100" of the scale 65. Another cassette C will have a scale with a lesser or larger number of graduations, e.g., 60, 70, 80, 90 or 110 graduations. The lead of threads on the spindle 63 of each cassette C is selected in such a way that the pointer 64 moves into at least substantial registry with the last graduation when the entire tape is collected by one of the reels therein, i.e., the lead of threads on the spindle is a function of the length of tape in the respective cassette. The length of tape in a particular cassette C is, in turn, selected as a function of the length of time necessary to record or reproduce a particular information. For example, if the tape is to be used for recordal of a piece of music which is to be played for 58 minutes, the operator will select a cassette C containing such a length of tape that the time required for transfer of tape from reel R1 onto reel R2 or vice versa is 60 minutes. Thus, the major part of the tape is used for recordal.

The scale 65 is provided on or in one side wall of the housing 61. If the cassette C contains magnetic tape with two sound tracks (i.e., an invertible cassette), the other side wall of the housing 61 is provided with a second scale (not shown) whose graduations run in the opposite direction, and the housing is provided with a further opening 72 permitting entry of the shaft 66 to place the worm 67 into mesh with a second worm wheel 73 on the spindle 63. The illustrated scale 65 is exposed when the worm 67 meshes with the worm wheel 68 (e.g., to transport the tape from the reel R2 onto the reel R1) and the other scale is exposed when the worm 67 meshes with the worm wheel 73 (to transport the tape from the reel R1 onto the reel R2).

An important advantage of the cassette C is that the pointer 64 is always located at the one or the other end of the scale (or scales) 65 when the entire tape is collected on the reel R1 or R2 (provided that the length of stored information is properly related to overall length of the tape). This is desirable to enhance the appearance of the cassette as well as to facilitate allocation of time which is required to reproduce the stored information. Thus, if the owner or user of a set of cassettes C knows that the tape in each cassette stores information from end to end, and the time available for reproduction is, for example, 70 minutes, the user will select a cassette with one or two scales 65 each having graduations 71 running from "0" to "70".

Furthermore, proper utilization of the full length of tape is especially important in connection with invertible cassettes C (having two scales 65). Thus, if the reproduction of information on one track would require only 65 minutes and the reproduction of information on the other track would require full 100 minutes, the tape would have to be transported without reproduction for full 35 minutes subsequent to reproduction of sound on the one track in order to insure that the reproduction of sound begins at the leading end of the other track.

The scales on both side walls of the housing 61 should be of identical or nearly identical length. This is necessary because the pointer 64 is moved along a single spindle 63 which transports the pointer through identical distances per each unit of time as long as the RPM of the shaft 66 remains unchanged. The scale 65 can be replaced with a scale similar to that shown at 8 in FIG. 1–6. The two rows of graduations are then provided on the panels 7' and 7''. The drive for the spindle 63 can be connected with the drive for the reel R1 or R2 in the same way as shown in FIG. 7, i.e., the speed at which the tape is transported is proportional to speed of the pointer 64.

Figure 9:
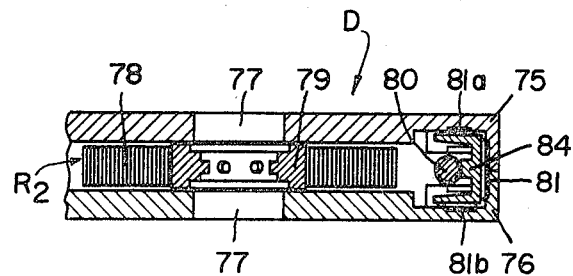
FIG. 9 is a fragmentary sectional view of a further cassette.
Figure 10:
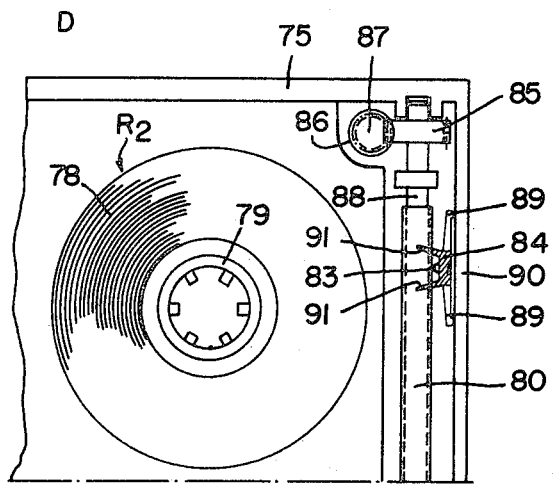
FIG. 10 is a fragmentary side elevational view of the cassette shown in FIG. 9, with one half of the housing removed.
Figure 11:
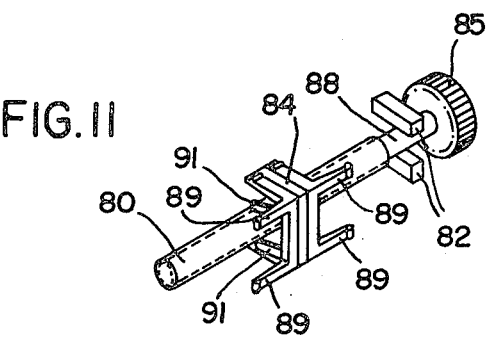
FIG. 11 is a fragmentary perspective view of the mechanism which moves the pointer in the cassette of FIGS. 9 and 10.

Referring finally to FIGS. 9–11, there is shown a portion of a further cassette D whose block-shaped housing comprises two preferably mirror symmetrical halves 75, 76 consisting of slightly elastic synthetic plastic material. The windows in the walls of the housing are disposed in the same way as shown in FIGS. 1 and 4. The side walls of the housing have two pairs of registering openings 77 (only one pair shown) which permit engagement between the coupling elements of the tape recorder and the cores 79 of the reels (only the reel R2 is shown in FIGS. 9 and 10). The cassette D can be placed onto the deck or inserted into the chamber of a tape recorder The supply of convoluted tape on the reel R2 is shown at 78.

The housing accommodates a spindle 80 which extends in parallelism with a scale and is mounted in two bearings 82 (only one shown). The scale is analogous to the scale 8 of FIGS. 1–6, it comprises a median panel 81 in one end wall of the housing and two outer panels 81a, 81b each of which is provided in one side wall of the housing. The threads of the spindle 80 mate with the thread or threads of a spindle nut or follower 83 which is connected to or integral with a pointer or index 84. At least that part of the housing which accommodates the panels 81, 81a, 81b of the scale consists of light transmitting material to facilitate observation of graduations on the panels as well as the position of the pointer 84. The latter is U-shaped and comprises a web which moves along the panel 81 and two legs which travel along the panels 81a, 81b. These panels can form integral parts of the housing.

The spindle 80 has an end portion which extends beyond the corresponding bearings 82 and carries a worm wheel 85 adapted to mate with a worm 86 on a shaft 87 when the cassette D is properly mounted on or in the tape recorder. Both ends of the spindle 80 are provided with smooth-surfaced cylindrical portions 88 (only one shown) which are inwardly adjacent to the respective bearings 82. The follower 83 can move into registry with one of the cylindrical portions 88 when the pointer 84 reaches the respective end of the threaded portion of the spindle 80. Also, the pointer 84 comprises two pairs of resilient guide arms 89 which bear against the adjacent end wall 90 of the housing and bias the follower 83 against the cylindrical portion 88.

If the core 79 of the reel R2 is rotated in a direction to collect the tape 78, and the drive of the tape recorder continues to rotate the core 79 after the follower 83 of the pointer 84 moves beyond one end of the threaded central portion of the spindle 80, the guide arms 89 merely bias the follower 83 against the respective cylindrical portion 88 but the pointer 83 remains at a standstill.

If the core 79 is thereupon rotated in the opposite direction to pay out the tape 78, or if the cassette D is inserted in inverted position so that the worm 86 drives the spindle 80 in the opposite direction, the follower 83 is automatically returned into mesh with the threaded portion of the spindle 80 by one pair of two additional pairs of resilient arms 91 on the pointer 84. One pair of arms 91 bears against the adjacent bearings 82 when the follower 83 engages the corresponding cylindrical portion 88. The bearings 82 constitute stop means against which one pair of resilient arms 91 reacts when the follower 83 moves beyond the respective end of the threaded portion, and the arms 91 thereupon compel the follower 83 to return into mesh with the spindle 80 as soon as the latter changes the direction of its rotary movement.

It is clear that the bearings 83 need not necessarily constitute a stop means for the arms 91, i.e., such stop means can be provided in addition to the bearings 82 (for example, if the bearings are installed at the outer side of the worm wheel 85).

The resilient arms 89, 91 preferably form integral parts of the pointer 84; this pointer can be made of a single piece of synthetic plastic material.

An important advantage of the cassette D is that the pointer 84 is not damaged when the spindle 80 continues to rotate after the pointer reaches one end of the scale and also that the pointer automatically reverses the direction of its movement without any delay as soon as the spindle 80 begins to rotate in the opposite direction.

The arms 91 can be provided on the bearings 82 or such arms can be provided on the pointer 84 as well as on the bearings.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. A cassette for magnetic tape or the like comprising a block-shaped housing having two opposed side walls and two pairs of opposed end walls; a pair of reels mounted in said housing; a length of magnetic tape having ends connected to said reels and movable lengthwise in response to rotation of said reels so as to be paid out by one reel and collected by the other reel or vice versa; and indicator means comprising a scale having a first portion extending lengthwise between said side walls and at least one second portion extending lengthwise in the general plane of one of said side walls, pointer means, and means for transporting said pointer means lengthwise of said scale, said scale have graduations indicating the length of the tape on one of said reels.

2. A cassette as defined in claim 1, wherein said scale consists of light transmitting synthetic plastic material.

3. A cassette as defined in claim 1, wherein said first portion constitutes one of said end walls and said scale comprises two second portions each located in the general plane of one of said side walls.

4. A cassette as defined in claim 3, wherein said scale is of U-shaped cross-sectional outline.

5. A cassette as defined in claim 4, wherein said second portions of said scale and said side walls comprise cooperating coupling portions providing a separable connection between said second portions and the respective side walls.

6. A cassette as defined in claim 5, wherein said coupling portions comprise complementary ribs and grooves.

7. A cassette as defined in claim 1, wherein said transporting means comprises an externally threaded spindle rotatably mounted in said housing and a follower connected with said pointer means and mating with said spindle.

8. A cassette as defined in claim 1, wherein said pointer means comprises a plurality of portions each adjacent to and movable lengthwise of a portion of said scale.

* * * * *